June 16, 1953  M. R. HART ET AL  2,641,843
FLIGHT POSITION LOCATER
Filed Dec. 26, 1951  2 Sheets-Sheet 2
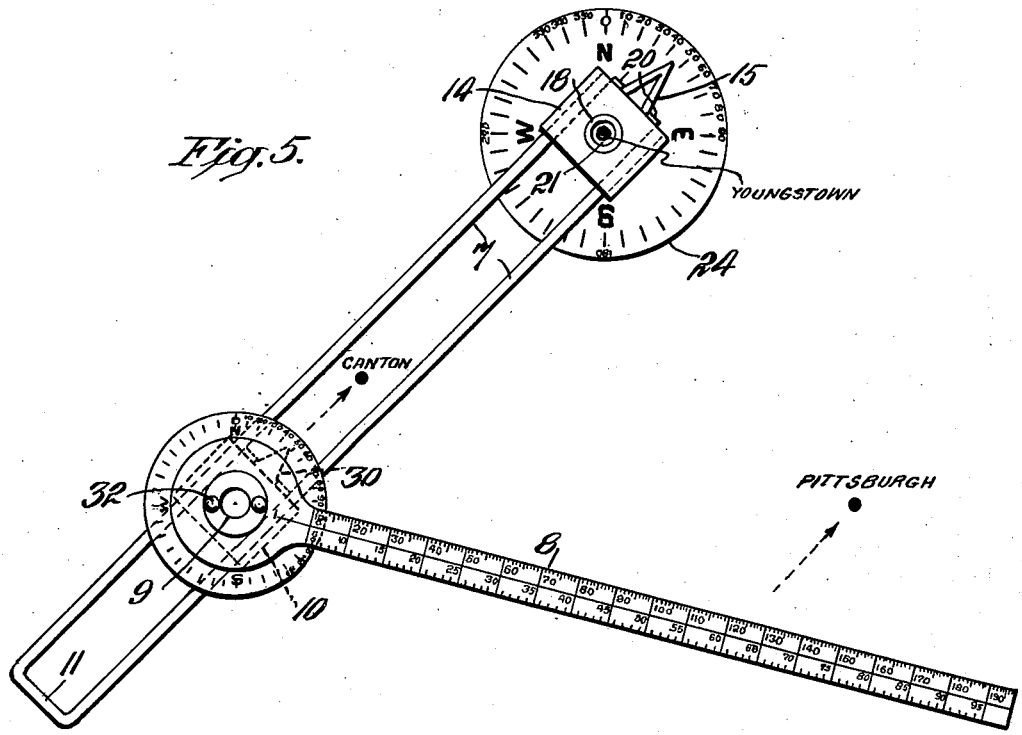
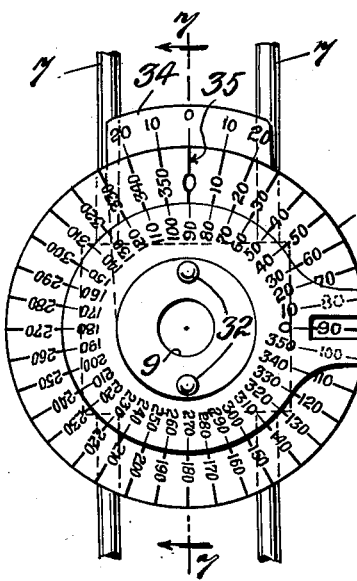
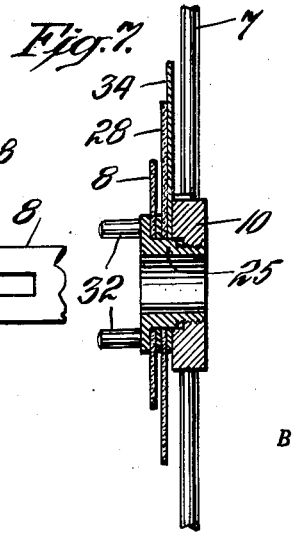
INVENTORS
MARION R. HART
BY FRANCESCO COLLURA
ATTORNEY Patented June 16, 1953

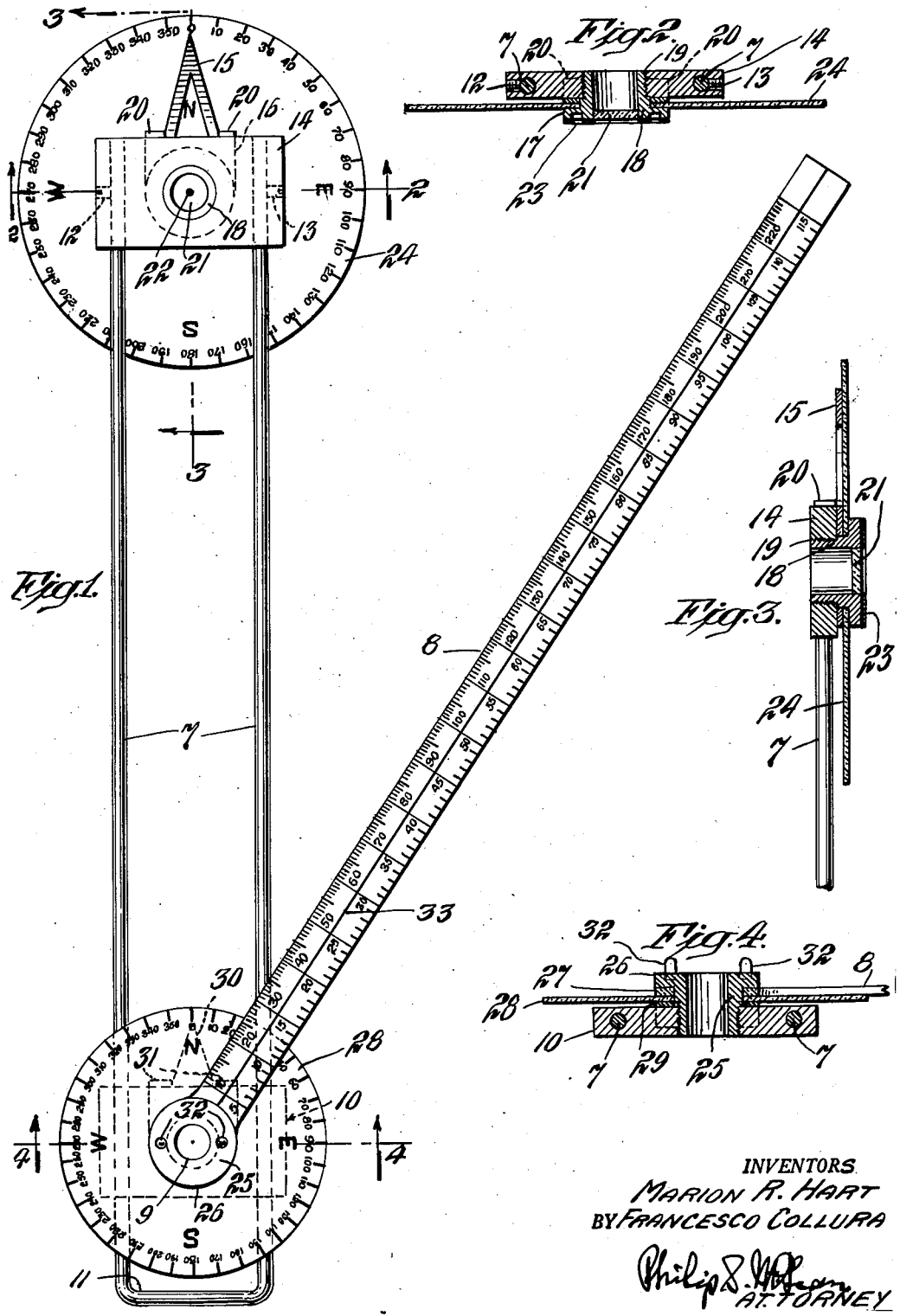

2,641,843

UNITED STATES PATENT OFFICE 2,641,843

FLIGHT POSITION LOCATOR

Marion R. Hart and Francesco Collura, New York, N. Y.

Application December 26, 1951, Serial No. 263,313

1 Claim. (Cl. 33—75)

The invention herein disclosed relates to navigational instruments, and the general purposes of the invention are to provide a simple and easily handled device by which the pilot of an aircraft can quickly determine position of the craft on a map or chart of the course being flown.

Particularly it is a purpose of the invention to provide this position locating instrument in a form which can be quickly and easily set to cross bearings taken from different stations and then, without computation or other time consuming operations, be adjusted immediately to show the flight position on the map.

Other special objects of the invention are to provide the device in a form which may be used when the position is located, to show distances in any direction, of other locations from that particular point.

Other desirable objects and the novel features through which the purposes of the invention are attained are set forth and will appear in the course of the following specification.

The drawings accompanying and forming part of the specification illustrate certain present practical embodiments of the invention. Structure, however, may be modified and changed as regards the immediate illustration, all within the true intent and broad scope of the invention as hereinafter defined and claimed.

Fig. 1 in the drawings is a plan view of one of the new position locaters;

Fig. 2 is an enlarged sectional view across the head of the instrument, on substantially the plane of line 2—2 of Fig. 1;

Fig. 3 is a broken sectional view on substantially the plane of line 3—3 of Fig. 1;

Fig. 4 is a sectional view across the slide, as on substantially the plane of line 4—4 of Fig. 1;

Fig. 5 is a plan view showing the instrument in use in locating a position over a chart.

Fig. 6 is a broken plan view of a modification providing corrections for compass variations;

Fig. 7 is a vertical sectional view as on substantially the plane of line 7—7 of Fig. 6.

The invention may be considered as comprising basically a pair of angularly related protractor arms which can be independently set to different cross bearings and then be adjusted along the axis of one bearing over a map to bring the center of coincidence of the arms into position indicating the location on the map.

The first arm is shown in the drawings as a guide and support made up of spaced parallel rods 7, and the second arm as an elongated scale 8 pivotally supported at 9 on a slide 10 longitudinally shiftable over the rods.

Specifically the rods are shown as one continuous piece of wire or rod material connected at one end in spaced relation by an intermediate length 11 of the material and having the opposite free ends of the U-shaped formation secured by set screws 12, 13, in the same spaced relation in the connecting head or cross bar 14.

A pointer 15 is shown extended from the end of the first arm, the same provided by a flat plate 16 clamped by the flange 17 of a tubular bushing 18 screwed into the center of the head at 19, Fig. 2.

The pointer plate is shown as having lugs 20 turned up over the outer edge of the head 14, Fig. 1, so as to hold the pointer against shifting relative to the center of the head.

The lower end of the tubular bushing is shown as closed by a sight glass 21 which may carry cross marks or a center point such as indicated at 22, for centering the head over a station marking on a map.

The lower or flanged end of the screw bushing 18 may be faced with sandpaper, soft rubber or other frictional material at 23, to hold the protractor in its located position on a map.

A compass card 24 which may carry the usual or special compass markings, is shown rotatably mounted on the hub of the tubular bushing 18, frictionally held and clamped by the flange 17 against the pointer plate 16 and the back of the head.

The screw bushing 18 is preferably adjusted so as to firmly hold the compass card in various positions of adjustment.

The second protractor arm 8 is shown as pivotally secured on the slide block 10 in generally the same manner by a tubular bushing 25 screwed in that block and having a flange 26, Fig. 4, clamping the hub 27 of the scale, and a compass card 28 against the plate portion 29 of a pointer 30 seated on the block and having turn preventing lugs 31 engaged over the edge of the block.

This screw bushing may carry projecting studs 32 or the like, providing grips for turning the stud to clamp or to release protractor arm 8 and compass scale 28.

The invention may be used by first taking a compass bearing on a radio station. The compass card 24 on the first arm may then be turned to carry that compass reading into register with the pointer 15.

The compass card 28 on the slide may then be set in the same angular relation with respect to pointer 30.

With the two compass cards in corresponding relation, a cross bearing may be taken on some station off at one side of the course and the second arm, 8, adjusted to the corresponding angular reading on the second compass scale.

After this has been effected the protractor may be placed over a map or chart of the course, with the mark 22 of the first compass card centered over the first bearing station on the map and with the first arm oriented so that "North" on the two compass scales will read true "North" on the chart. This brings the two protractor arms into correct relation with locations on the chart and enables the present position of the craft then to be immediately ascertained by simply shifting the slide block one way or the other along the first arm until the second arm intersects the station on the map toward which the second bearing was taken. Then the center of intersection between the two arms, as seen through the tubular bushing 25, will designate the position on the map of the craft at the time the cross bearings were taken.

The specific example shown in Fig. 5 supposes a case in which the aircraft is headed northeasterly toward Youngstown, and in which a compass bearing taken on Youngstown shows a reading of 48°.

With this bearing ascertained, both compass dials 24 and 28 are set at 48° on pointers 15 and 30. A cross bearing then taken on Pittsburgh as a convenient reference point may then show 115°. The second protractor arm 18 is accordingly shifted to 115° on compass scale 28, the center line 33 of this scale being used in effecting this setting. The clamp bushing 25 which holds the compass scale and protractor in these adjusted relations may be tightened to assure their remaining in these positions.

The instrument is then placed over the course chart with the center 22 of the first protractor arm located over the first bearing station on the chart and the arm turned to register the compass card with the corresponding compass notations on the chart. In this particular instance this would center the first compass card 24 over Youngstown on the map, with the first arm pointing in the northeasterly direction. Then while holding the first arm thus oriented on the chart, it is only necessary to shift the slide 10 along the first arm until the angularly extended second arm 8, which was angled to the Pittsburgh station, lines up with the Pittsburgh center on the map.

The immediate location then will be the conjunction of the two relatively inclined protractor arms, in other words, the location on the map seen through the center of the tubular bushing 25, which in this particular instance would be Canton.

With the immediate location ascertained, the direction and distance of other stations relative to that point can be quickly ascertained by simply rotating the second arm, 8, about the supporting center 9. This arm may be scaled, as indicated, in miles or other measurement to accord with the measurements on the chart, so that distance and direction may be read directly.

The invention may be used with ADF (automatic direction finder) or other such systems presently in operation.

To provide correction for compass variations the fixed pointer 30 on the slide may be replaced by a correction card such as indicated at 34, Fig. 6, and which can be shifted to one side or the other of the central pointer marker 35, and then the zero on this scale used in place of the fixed pointer.

The device may be relatively small, light in weight and when folded takes up but little room. It may be conveniently used in a crowded cockpit without interfering with other instrumentalities. Of particular importance is the fact that it is only necessary to take the two cross bearings and set the compass scales and protractor arms accordingly, after which the intersection center of the two arms will provide a direct location reading on the map or chart.

A further advantage is that the device consists of relatively few parts and can be produced at low cost. The compass scales and pivotally supported protractor arm may be of transparent plastic so as to be easily readable and so as not to obscure markings on the map.

The parallel rods may be of wire, small enough in diameter not to appreciably obscure points on the map.

What is claimed is:

A device for showing flight position on a map, comprising a protractor arm made up of spaced parallel rods connected at one end by a cross bar having an opening therethrough to provide a reference center for location over a reference point on a map and having a pointer on the axis of the arm, a compass dial rotatably adjustable about said reference center and positioned with said pointer reading on the compass scale and whereby after obtaining a fix from a station in the heading direction said compass dial may be adjusted in respect to said pointer to the reading of the compass in such heading direction and the protractor arm then be positioned on a map of the terrain with the north of the compass dial aligned with north on the map and the protractor arm then in the heading direction with the reference center over the reference station from which the fix was obtained, a block slidingly guided over the parallel rods and having a reference opening therethrough between the rods on the axis of the arm to show positions on the map in the heading direction, a compass dial rotatably adjustable on said slide block about said reference opening, a pointer on said slide block, on the axis of the arm and registering on said second compass dial for enabling said second compass dial to be adjusted on the slide block to the same compass setting as the first compass dial, a second protractor arm pivotally adjustable on the slide block about said reference opening and having an axis readable on said second compass dial whereby said second protractor arm may be adjusted to the true direction of a second station at one side of the heading, clamp means for securing the second protractor arm in relatively adjusted, angular relation on the slide block and said slide block having free sliding adjustment over said rods whereby after the second protractor arm has been secured in the angled relation pointing to a second station from which a fix has been obtained, the slide block may be adjusted longitudinally of the first arm to carry the axis of the second angularly adjusted arm into register on the map with the second station and whereupon the reference passage in the slide block will then show the present flight location on the map.

MARION R. HART.
FRANCESCO COLLURA.

References Cited in the file of this patent

UNITED STATES PATENTS

| Number | Name | Date |
|---|---|---|
| 1,074,851 | Ewbank | Oct. 7, 1913 |
| 1,828,807 | Kennedy | Oct. 27, 1931 |
| 2,238,190 | Sawtelle | Apr. 15, 1941 |

FOREIGN PATENTS

| Number | Country | Date |
|---|---|---|
| 79,665 | Switzerland | Apr. 1, 1919 |
| 807,692 | France | Oct. 19, 1936 |